United States Patent
Tarazaga Carrasco

[11] Patent Number: 6,027,394
[45] Date of Patent: Feb. 22, 2000

[54] ONE WAY VALVE FOR INFLATABLES AND PROCESS FOR PRODUCTION AND INCORPORATION IN THE INFLATABLE

[76] Inventor: Juan Jose Tarazaga Carrasco, Passatge Salvado Espriu, 2 3°2ª, Terrassa, Spain

[21] Appl. No.: 09/179,646

[22] Filed: Oct. 27, 1998

Related U.S. Application Data

[62] Division of application No. 08/860,840, filed as application No. PCT/ES96/00170, Sep. 10, 1996, Pat. No. 5,878,768.

[30] Foreign Application Priority Data

Oct. 10, 1995 [ES] Spain ...................................... 9501951

[51] Int. Cl.[7] ...................................................... A63H 3/06
[52] U.S. Cl. ............................................ 446/224; 446/220
[58] Field of Search .............................. 137/15, 223, 884, 137/846, 848; 446/220, 222, 224

[56] References Cited

U.S. PATENT DOCUMENTS

| | | | |
|---|---|---|---|
| 4,560,360 | 12/1985 | Isaacs et al. ............................. | 446/222 |
| 4,917,646 | 4/1990 | Kieves . | |
| 4,976,649 | 12/1990 | Mandell .................................. | 446/220 |
| 5,108,339 | 4/1992 | Kieves ................................. | 446/220 X |
| 5,188,558 | 2/1993 | Barton et al. ....................... | 446/220 X |
| 5,248,275 | 9/1993 | McGrath et al. ....................... | 446/224 |
| 5,295,892 | 3/1994 | Felton ................................. | 446/220 X |
| 5,451,179 | 9/1995 | LaRoi, Jr. et al. ................. | 446/220 X |
| 5,499,941 | 3/1996 | Penjuke, Sr. ........................... | 446/222 |
| 5,769,683 | 6/1998 | Park ...................................... | 446/220 |
| 5,807,157 | 9/1998 | Penjuke ................................. | 446/220 |

FOREIGN PATENT DOCUMENTS

| | | |
|---|---|---|
| 0 356 013 | 2/1990 | European Pat. Off. . |
| 2641597 | 7/1990 | France . |
| 1020862 | 4/1992 | Spain . |

*Primary Examiner*—Sam Rimell
*Attorney, Agent, or Firm*—Darby & Darby

[57] ABSTRACT

The valve consists of a strip onto which two coplanar strips are welded separated by an opening. Production of the valve takes a strip onto which two strips are welded separated by a space. The valve obtained is welded onto a laminar, which forms part of the inflatable, with a hole which has to coincide with the valve opening. Next the first sheet is welded to a second laminar which forms the inflatable. The same process obtains a double valve with a single entry.

7 Claims, 3 Drawing Sheets

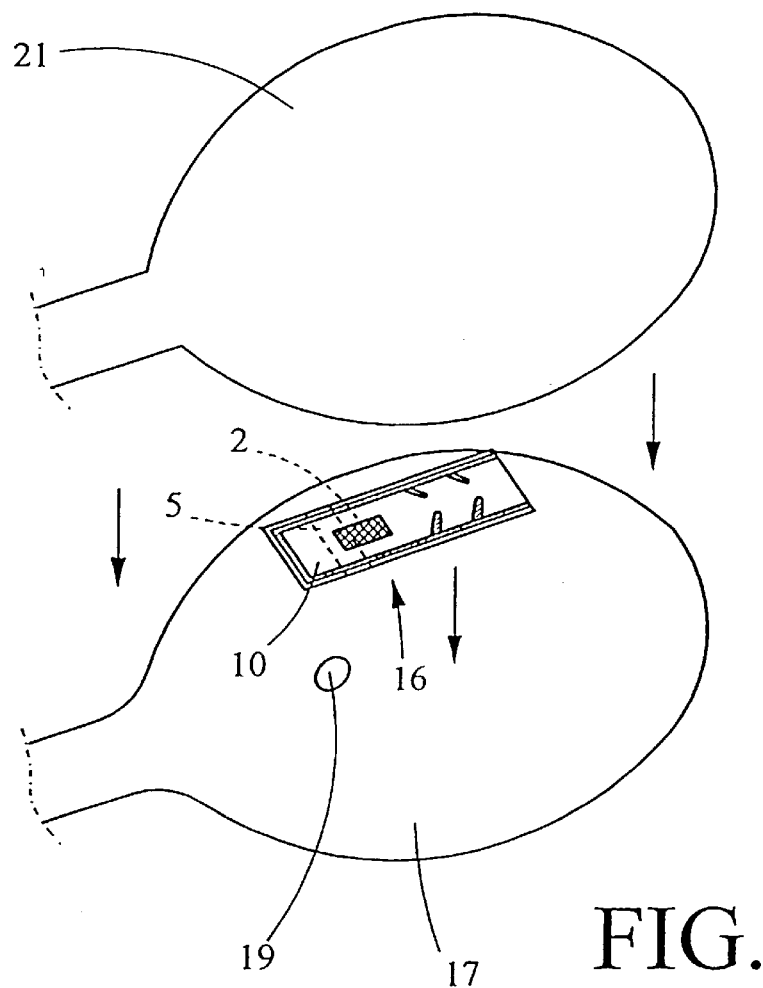
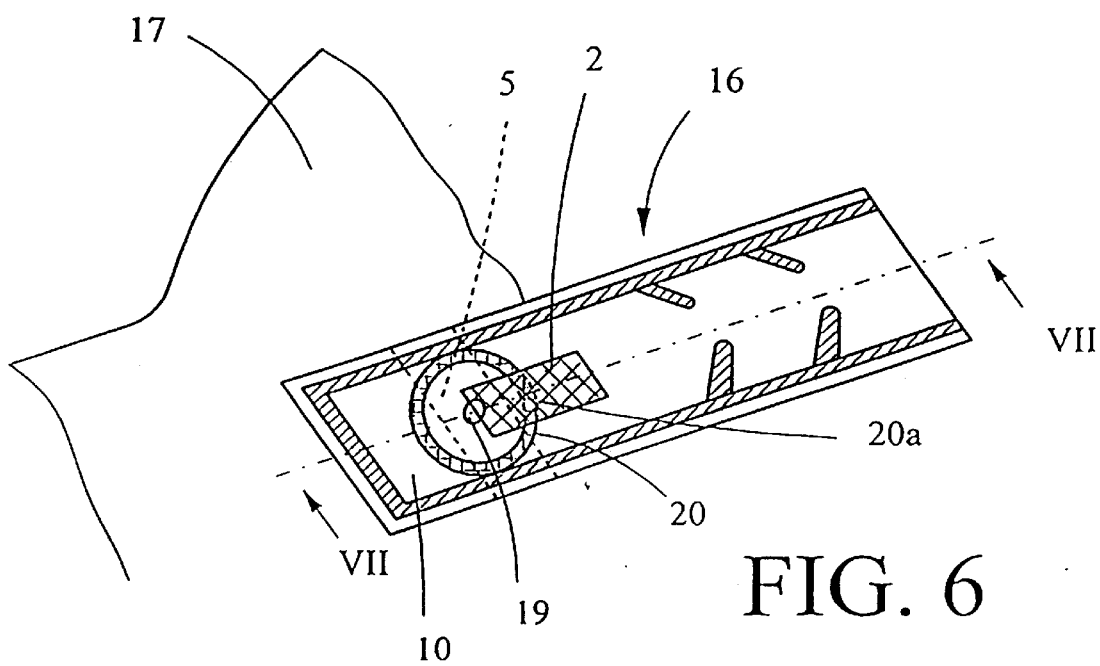

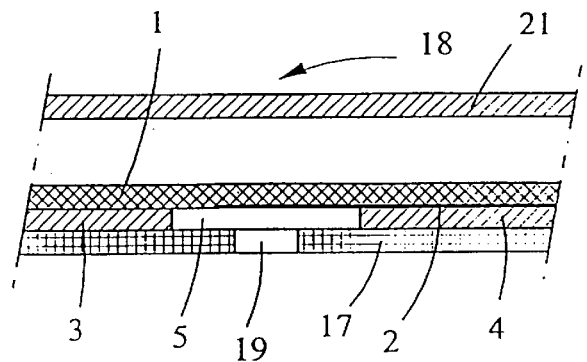
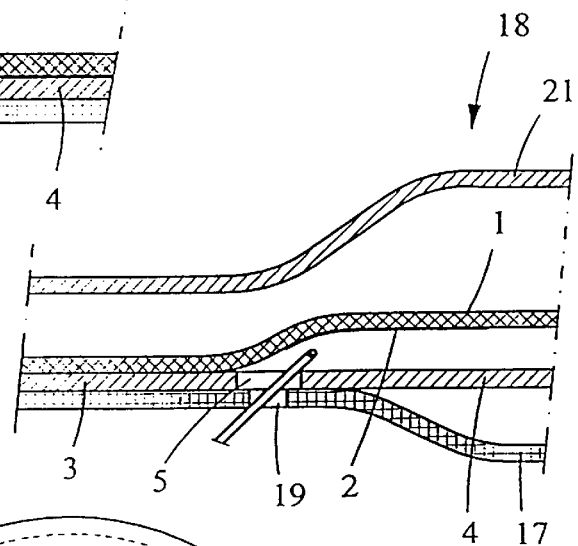
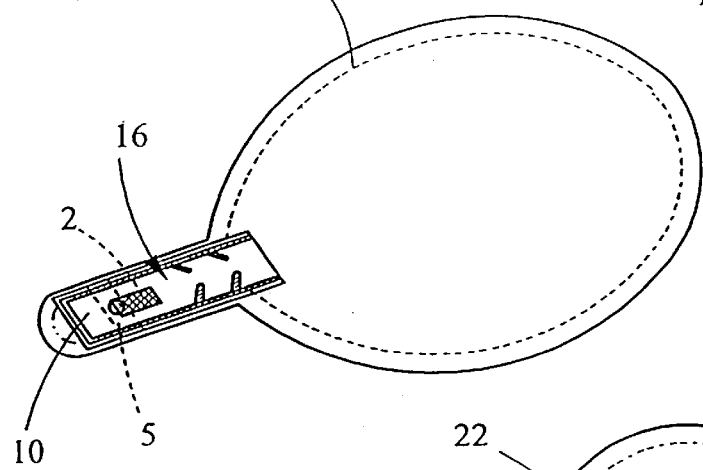
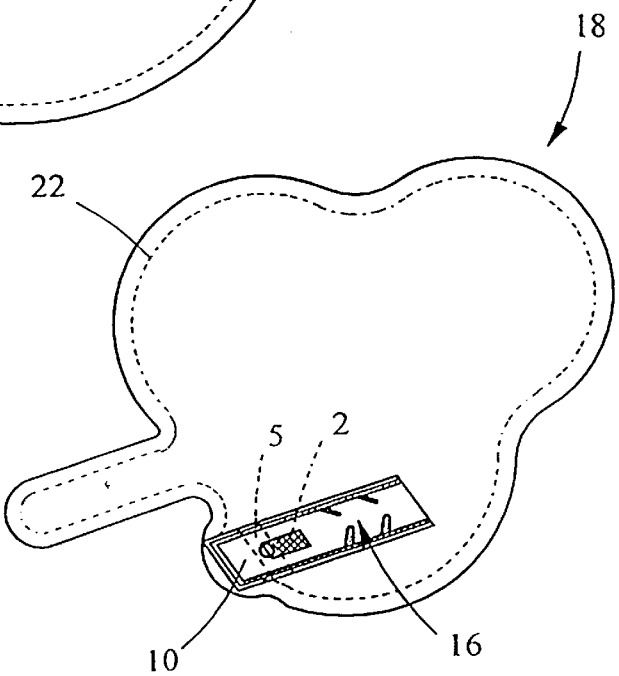

I

ONE WAY VALVE FOR INFLATABLES AND PROCESS FOR PRODUCTION AND INCORPORATION IN THE INFLATABLE

This is a division of application Ser. No. 08/860,840, filed Jun. 10, 1997, now U.S. Pat. No. 5,876,768, which application is a §371 of PCT/ES96/00170 filed Sep. 10, 1996. Each of these prior applications are hereby incorporated herein by reference, in its entirety.

This invention concerns a one way valve for inflatables such as balloons with at least one internal layer of heat weldable material. This valve is of the type which allows the input of gas into the inflatable and shuts off the valve as a result of the bending action of the pressure of the gas inside the balloon. This invention also concerns a manufacturing process for the valve and a process for fitting it into the balloon. From this point on we shall call "balloon" any ball or inflatable to which this valve can be fitted.

BACKGROUND OF THE INVENTION

A valve type which is already known consists of two laminar strips of different lengths which are joined together by lengthwise weld lines. This forms a laminar valve shaped like a tube with one end open for the intake of gas which is accessible from the outside and one outlet end opening into the inside of the balloon. On the entry end of the valve there is a flap made up of an extension of one of the strips. This protects the balloon sheet like material to which the valve is welded. Moreover, in the area next to the end of the valve input one of the strips has an non-weldable covering which reaches a location close to the flap. Thus, when the valve is being welded to one of the sheets which make up the balloon the opening is not blocked.

One problem with this type of valve is that the protective flap on the end of the entry opening does not sufficiently prevent damages to the balloon when the inflation nozzle is used.

Another problem concerns the correct placing of the prefabricated valve into one of the internal faces of the balloon in order to weld together the valve and the sheets which make up the balloon. These problems with positioning make it difficult to obtain a fast and efficient production process.

DESCRIPTION OF THE INVENTION

In order to solve the problems explained above, the valve which is the object of this invention was designed, along with the production process and method of incorporation into the balloon.

The valve is of the type which allows the input of gas into the inflatable and shuts off the same as a result of the pressure of the gas inside the balloon folding or bending over the exit. A valve of this type consists of two heat weldable laminar strips welded together by lines of welding which form a laminar valve shaped like a tube with one intake end, for gas input, accessible from the outside and one output end communicating with the inside of the balloon. Strips of weld cause internal strangulation in the valve to prevent the return of gas. One of the strips has an non-weldable covering that coincides with the valve opening. Based on the premises explained above, the valve is characterised by the fact that on one of the sides of the first strip in the area with non-weldable covering a second and third coplanar strips are welded, spaced out lengthwise, so that there is a crosswise space between them which coincides in part with the non-weldable area. This space is the opening for the entry of gas. The second and third strips respectively reach the end of the first strip.

One option is for the second and third strips to be of different lengths and to be welded to the first strip by lengthwise lines and a transverse line coinciding with the end of the valve closest to the entry opening. On the other side of this opening the two strips are welded by sloping lines which form a strangulated passage.

A second option is for the second and third strips to be of the same length so that the space for the entry is in the middle of them. The second and third strips are welded to the first strip by lengthwise lines and by two groups of sloping lines on either side of the entry opening which form various strangulated passages thus creating a double valve with open ends and a single entry. This double valve forms a nexus between two inflatables.

The production process for the valves and the method of incorporating them into a balloon is characterised by the fact that on one side of a first continuous strip of heat weldable material, with the inside with equally spaced non-weldable areas, second and third heat weldable coplanar strips are placed, spaced out so that the space between them coincides at least in part with the non-weldable areas. Once the strips have been superimposed, they are joined together with, at least, lines of heat weld placed transversely to the direction of the strips and with sloping lines forming strangulated passages. Once the strips have been welded they are cut transversely to obtain the valves. Next, these valves are placed in sequence on the inside of a heat weldable strip on which regularly spaced holes have been made so that the valve openings coincide with the holes. Then, the valves are joined to the strip by lines of heat weld placed on the non-weldable area. Next, a second heat weldable strip is joined to the valve strip by lines of weld which go around the balloon. The process is finished by stamping each of the welded strips to obtain balloons with valves inside.

BRIEF DESCRIPTION OF THE DRAWINGS

Drawings have been included to this description to facilitate understanding of the same. An example case has been given of creating a valve, the processes of production and incorporation of the valve in the balloon.

FIG. 5 is a perspective schematic view showing the first stage of the process of incorporating the valve in a balloon in production; FIG. 6 shows a valve incorporated into a laminar of the balloon; FIG. 7 is a sectional view through the cut VII—VII of FIG. 6; FIG. 8 is a view similar to the previous view showing an inflation nozzle inserted into a valve incorporated in a balloon; and FIGS. 9 and 10 are schematic views of different balloons with valves incorporated.

DESCRIPTION OF A PREFERRED EMBODIMENT

Figure 1:
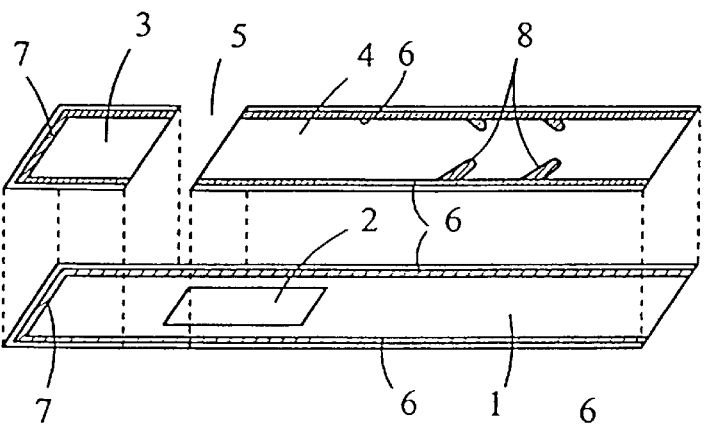
FIG. 1 is a perspective view of the valve parts.

The valve consists in the drawings of a first laminar strip -1- of heat weldable material with an area -2- of non-weldable material. On one side of strip -1- the other two strips of different lengths -3- and 4- are welded with a space -5- between them which is an opening for gas and which partly coincides with area -2-. Strips -3- and 4- are welded to strip -1- by lengthwise lines -6-, a transverse line -7- and pairs of sloping lines -8- which make a strangulated passage -9- of known type. It is important to point out the transverse line -7- which closes one end of the valve. Between the opening -5- and line -7- there is a double flap formed -10- for strengthening (FIG. 2) which prevents the balloon from being damaged when a nozzle is inserted for inflating (FIG. 8).

Figure 2:
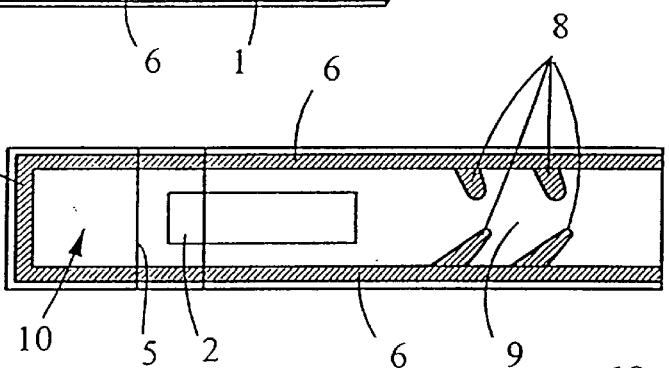
FIG. 2 is a plan view of the valve.
Figure 3:
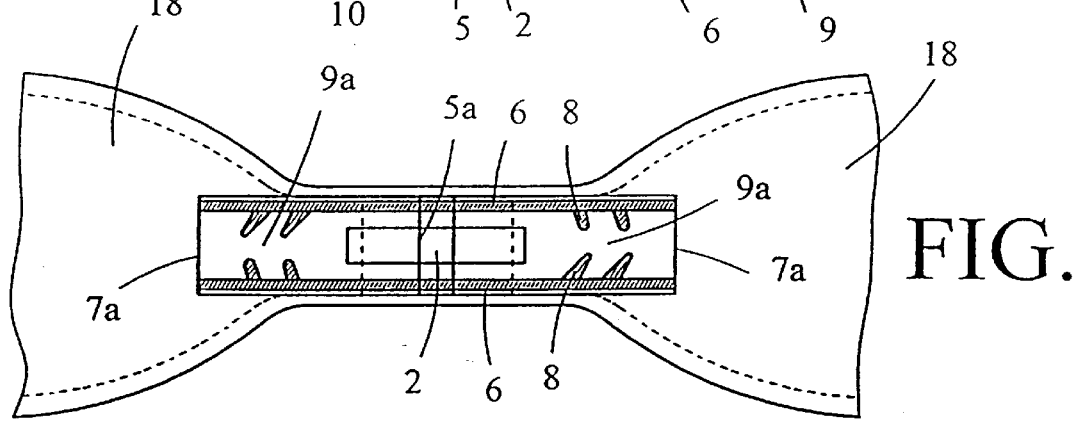
FIG. 3 is a plan view of a double valve.

A second version is a double valve shown in FIG. 3 which is similar to that shown in FIG. 2 but whose basic characteristic is that it has two strangulated openings -9a-, a middle opening -5a- which is common to the two valves, and open ends -7a-. This valve is used as a nexus between two balloons -18-.

Figure 4:
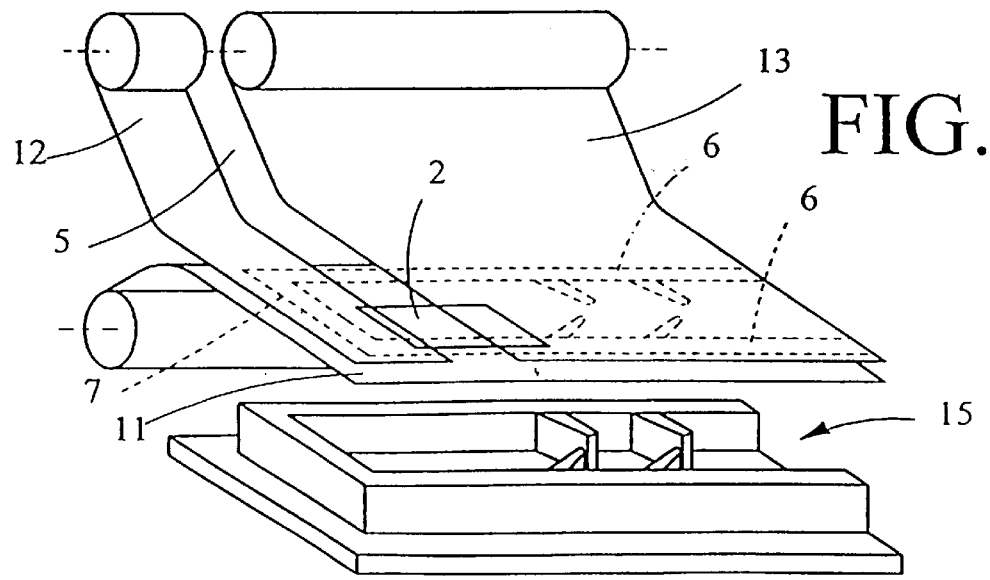
FIG. 4 is a perspective schematic view showing the basic part of the production process for the valves.

FIG. 4 shows the main stage in the production process for valves such as those described. This process involves one continuous strip -11- of heat weldable material which includes equally spaced areas -2- of non-weldable material. On one of the sides of strip -11- two other strips of heat weldable material -12- and -13- are juxtaposed. The are separated by a space -5- of the width of the valve opening to be obtained. This space partly coincides with the non-weldable areas -2-.

Once the strips have been juxtaposed they are heat welded with an electrode -15- which welds the strips in sequence on lines -6-, -7-, -8- according the version in FIGS. 1 and 2, or only lines -6-, -8- for the version in FIG. 3. Then, the welded strips are cut transversely and in sequence to obtain the valves -16-.

The valves are placed in sequence, either on a continuous strip or freely, onto one side of a heat weldable sheet -17- which is part of a balloon -18-. Each valve must be placed so that the entry -5- coincides with a hole -19- made in the sheet -17- (FIG. 6). Next, the valve is welded -16- onto the sheet -17- by a line of weld -20- which partly coincides with the non-weldable area -2- leaving a strip -20a- unwelded so that the valve is not blocked off inside. Once the valve has been welded to the sheet -17- a second heat weldable sheet -21- is welded which is part of the balloon -18- and the strips are joined together by a line of weld -22- which goes around the contour of the balloon. Whilst welding, the sheets can be cut to obtain the balloon with the valve incorporated.

The processes of production and incorporation of the valve in the balloon are very simple since opening -5- is obtained without having to cut or stamp the laminas. They simply have to be kept apart during the welding process (FIG. 4) making it easy for the continuous separation -5- between the strips to coincide with the non-weldable areas -2-. The process of incorporating the valve into the balloon has the advantage that the positioning of the valve -16- on the laminar -17- is very easy, simply coinciding opening -5- with hole -19-. This process can be carried out automatically in sequence thus reducing costs.

It is important to point out that the internal pressure of the gas inside the balloon presses the sheets together which make up the valve -16- and presses them against the inside wall of the balloon in area -20- thus forming an additional closure to that of the valve.

It is also important that with the process described above it is possible to obtain single valves (FIG. 2) or double (FIG. 3) by simply changing the widths of the strips. The characteristics of the valves and the process of obtaining them and incorporating them into the balloon means they can be placed in the central part of the balloon (FIG. 5), in the neck (FIG. 9) or close to its periphery (FIG. 10).

What is claimed is:

1. A method for mounting a valve having a non-weldable area to an inflatable object including at least a first and second sheet, said first sheet having a hole defined in the surface thereof, said first and second sheets being welded together to form a cavity accommodating and storing a medium for expanding said inflatable object, said method comprising the steps of:

laying said valve on an interior surface of said first sheet so that a surface opening in said valve is aligned with the hole;

welding said valve to said first sheet by a welding line provided around the hole and crossing the non-weldable area;

placing said second sheet on said first sheet;

welding said second sheet to said first sheet using a welding line following a desired shape of said inflatable object; and punching out said inflatable object from said welded sheets according to the desired shape of said inflatable object.

2. A method in accordance with claim 1, further comprising the step of providing inside said valve, means for preventing welding in an area of the opening.

3. A method in accordance with claim 2, wherein said welding step further comprises arranging the welding line for welding said valve to said first sheet so that it crosses the means for preventing welding.

4. A method in accordance with claim 1, wherein said step of aligning the opening of said valve with the hole occurs at least approximately at the moment that said valve is welded with said first sheet.

5. A method in accordance with claim 1, wherein said inflatable object is a balloon.

6. The method in accordance with claim 1, said inflatable object includes a stem and a body, wherein the hole defined in said first sheet is located in the body of said inflatable object.

7. The method in accordance with claim 1, said inflatable object includes a stem and a body, wherein the hole defined in said first sheet is located in the stem of said inflatable object.

* * * * *

UNITED STATES PATENT AND TRADEMARK OFFICE
CERTIFICATE OF CORRECTION

PATENT NO.   : 6,027,394
DATED        : February 22, 2000
INVENTOR(S)  : Juan Jose Tarazaga CARRASCO It is certified that error appears in the above-identified patent and that said Letters Patent is hereby corrected as shown below:

On the title page, item:

[76] Inventor residence, " SALVADO" should be

--SALVADOR--.

<div align="right">

Signed and Sealed this

Thirteenth Day of February, 2001

</div>

Attest:

NICHOLAS P. GODICI

Attesting Officer     Acting Director of the United States Patent and Trademark Office